Feb. 25, 1936.   C. H. COTTON   2,032,316
VALVE
Filed April 28, 1934
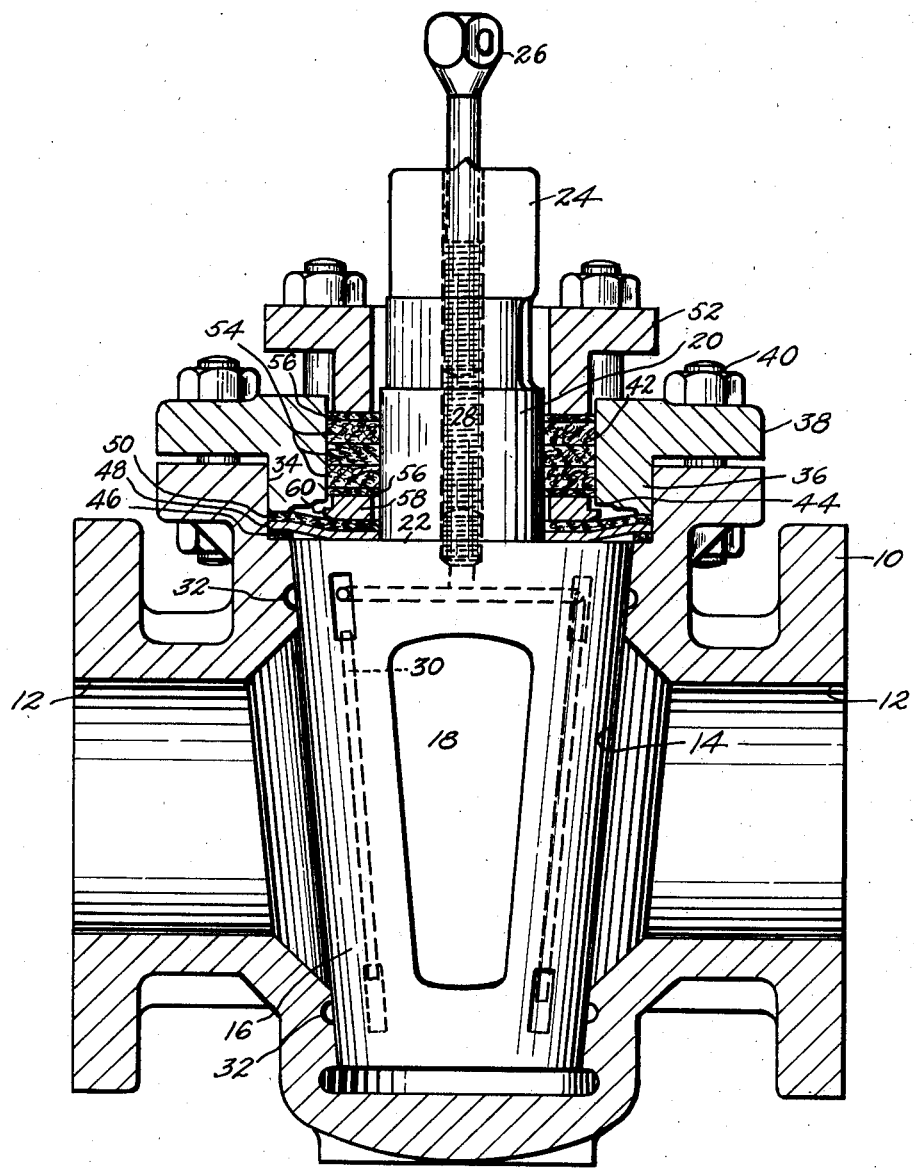
INVENTOR.
Charles H. Cotton
BY
Albert J. Henderson
HIS ATTORNEY.

Patented Feb. 25, 1936

2,032,316

UNITED STATES PATENT OFFICE 2,032,316

VALVE

Charles H. Cotton, Kewanee, Ill., assignor to Walworth Patents Inc., Boston, Mass., a corporation of Massachusetts Application April 28, 1934, Serial No. 722,840

8 Claims. (Cl. 251—93)

This invention relates to valves and more particularly to lubricated plug valves.

One object of the invention is to permit repacking a valve while under line pressure without leakage therefrom.

Another object of the invention is to hold the valve member resiliently to its seat to permit jacking thereof by lubricant under pressure.

Another object of the invention is to promote easy turning of the valve member in its seat.

Other objects and advantages will become apparent from the following description taken in connection with the accompanying drawing wherein is illustrated a longitudinal section through the improved valve.

Referring more particularly to the drawing the valve comprises a casing 10 having a fluid passageway 12 therethrough and a tapered valve seat 14 in which is seated a tapered valve member 16 having a port 18 adapted to register with the passageway 12 when the valve is in open position.

The valve member 16 is provided with a stem 20 defining a shoulder 22 on the valve member 16 and having a squared end 24 to receive a wrench by which the valve member can be turned in its seat. Lubricant may be introduced under pressure to the valve seat 14 by means of the lubricant screw 26 threadedly engaging a reservoir 28 in the valve stem which communicates with longitudinal grooves 30 and circumferential or optionally spiral grooves 32 formed in the valve member 16 and its seat 14.

The casing 10 is provided at the larger end of the valve seat with an annular recess 34 for the reception of a depending flange portion 36 of a cover member 38, secured to the casing 10 as by means of the bolts 40. The cover member 38 is provided with a bore 42 spaced from the periphery of the stem 20 to form a stuffing box. In this instance the end face of the flanged portion 36 is provided with a stepped annular recess 44 for purpose to be described hereinafter.

This invention is more particularly directed toward providing means to permit the valve to be repacked while under line pressure without leakage therefrom and without interference with the normal resilient seating of the valve member which permits jacking of the latter from its seat for introducing lubricant under pressure thereto. To this end an annular gasket 46 is seated at the bottom of the recess 34 in the casing and superimposed thereon is a metallic diaphragm 48 having a resilient backing 50. The diaphragm 48 and its backing 50 preferably closely engage the wall of the recess 34 and extend across the shoulder 22 of the valve member into close engagement with the stem 20. The inner portion of the diaphragm 48 is seated against the shoulder 22 by means of a packing gland 52 adjustable in the stuffing box 42 and engaging a plurality of resilient packing rings 54 therein. The packing rings 54 as a unit may be covered on the upper and lower surfaces by annular gaskets 56 in order to prevent undue spread of the packing rings 54. The inner and outer edges of the gaskets 56 preferably closely engage the wall of the stuffing box and the valve stem respectively.

Loosely mounted on the stem 20 between the lower gasket 56 and the diaphragm is a metallic spreader ring 58 having a projecting annular flange 60 which is spaced from the recessed portion 36 of the cover 38 when the valve member is seated. The spacing of the flange 60 from recess 36 has been exaggerated in the drawing for the purpose of clarity and it will be understood that in practice this space is but a few thousandths of an inch in size.

From the foregoing description of the improved construction it will be apparent that the valve member is held resiliently to its seat and may be lifted or jacked therefrom whether the valve is open or closed by the vertical component of pressure set up by the lubricant under pressure in the grooves 30 and 32 acting on the tapered seating surface. The lifting action of the valve member may cause the flange 60 to seat itself against the recessed portion of the cover member 38 but ample clearance is afforded at this point as described. Accordingly, the normal operation of a lubricated valve is not interfered with in any way by this invention which, as will now be described, permits the packing 54 to be replaced while the valve is under pressure from the fluid passing therethrough.

The repacking of the valve while under pressure may be accomplished by removing the packing gland 52 whereupon the packing rings 54 and gaskets 56 may be withdrawn from the stuffing box. It will be apparent that upon relieving the valve member from the pressure of the packing gland it will rise in its seat due to the unbalanced pressure in the valve. The valve member is, however, prevented from being blown entirely out of the casing by the engagement of the flange 60 of spreader ring 58 with the recessed portion 46 of the cover member 38. As previously stated, the space between these members when the valve is seated is but a few thousandths of an inch and the lift of the valve member will therefore barely be discernible. At the same time the diaphragm 48 will remain seated against the shoulder 22 as the valve member and spreader ring will move as a unit. In this manner the seal between the diaphragm and the shoulder remains unbroken at any time, thus preventing leakage from the stuffing box during the repacking operation.

I claim:

1. A valve comprising a casing having a valve seat, a valve member engaging said seat, a cover secured to the casing, a stem extending from the valve member adjacent said cover and defining a shoulder on said valve member, sealing means interposed between the casing and the cover and extending to the valve stem, means for seating the sealing means against the shoulder, and means adapted to engage the cover and maintain the sealing means seated independently of the first said means.

2. A valve comprising a casing having a valve seat, a valve member engaging said seat, a cover secured to the casing, a stem extending from the valve member adjacent said cover and defining a shoulder on said valve member, sealing means interposed between the casing and the cover and extending to the valve stem, means for resiliently seating the sealing means against the shoulder, and means adapted to engage the cover and maintain the sealing means seated independently of the first said means.

3. A valve comprising a casing having a tapered valve seat, a tapered valve member engaging said seat, a cover secured to the casing, a stem extending from the valve member adjacent said cover and defining a shoulder on said valve member, sealing means interposed between the casing and the cover and extending to the valve stem, a resilient packing for the stem surmounting the sealing means, adjustable means for compressing the packing and seating the sealing means against said shoulder, and means interposed between the sealing means and the packing adapted to engage the cover and maintain the sealing means seated independently of the adjustable means.

4. A valve comprising a casing having a tapered valve seat, a tapered valve member engaging said seat, a cover secured to the casing, a stem extending from the valve member adjacent said cover and defining a shoulder on said valve member, sealing means interposed between the casing and the cover and extending to the valve stem, a resilient packing for the stem surmounting the sealing means, adjustable means for compressing the packing and seating the sealing means against said shoulder and an annular member interposed between the sealing means and the packing and normally spaced from said cover but engageable therewith to maintain the sealing means seated independently of the adjustable means.

5. A valve comprising a casing having a tapered valve seat, a tapered valve member engaging said seat, a cover secured to the casing, a stem extending from the valve member adjacent said cover and defining a shoulder on said valve member, means for introducing lubricant under pressure to the valve seat, sealing means interposed between the casing and the cover and extending to the valve stem, a resilient packing for the stem surmounting the sealing means, adjustable means for compressing the packing and seating the sealing means against said shoulder, an annular member interposed between and engaging the sealing means and the packing, and means on said annular member normally spaced from said cover but being engageable therewith when the valve member is disengaged from its seat.

6. A valve comprising a casing having a tapered valve seat, a tapered valve member engaging said seat, a cover secured to the casing and overlying the valve member, a stem extending from the valve member and spaced from said cover forming a stuffing box therebetween, said stem defining a shoulder on said valve member, means for introducing lubricant under pressure to the valve seat, a diaphragm interposed between the casing and the cover and extending to the valve stem, a resilient packing in said stuffing box and surmounting said diaphragm, a packing gland on the cover for compressing the packing and seating the diaphragm against said shoulder, an annular member interposed between the diaphragm and the packing, and a flange projecting from said annular member and normally spaced from the overlying portion of the cover but being engageable therewith when the valve member is disengaged from its seat.

7. A valve comprising a casing having a passageway therethrough and a tapered valve seat, a tapered valve member engaging said seat and having a port adapted to register with said passageway, the casing being provided with an annular recess surrounding the larger end of the valve seat, a cover secured to the casing and having a flanged portion depending into the recess and overlying said valve member, a stem extending from the valve member and spaced from the flanged portion of the cover to form a stuffing box, said stem defining a shoulder on said valve member, means for introducing lubricant under pressure to the valve seat, a diaphragm clamped in said recess by the flanged portion of the cover and extending to the valve stem, a resilient packing in said stuffing box and surmounting said diaphragm, a packing gland on the cover for compressing the packing and seating the diaphragm against said shoulder, an annular member interposed between and engaging the diaphragm and the packing, and an annular flange projecting from said annular member and normally spaced from the overlying flanged portion of the cover but being engageable therewith when the valve member is disengaged from its seat.

8. A valve comprising a casing having a passageway therethrough and a tapered valve seat, a tapered valve member engaging said seat and having a port adapted to register with said passageway, the casing being provided with an annular recess surrounding the larger end of the valve seat, a cover secured to the casing and having a flanged portion depending into the recess and overlying said valve member, said flanged portion having a recessed end face, a stem extending from the valve member and spaced from the flanged portion of the cover to form a stuffing box, said stem defining a shoulder on said valve member, means for introducing lubricant under pressure to the valve seat, a resiliently backed metal diaphragm clamped in said recess by the flanged portion of the cover and extending to the valve stem, a resilient packing in said stuffing box and surmounting said diaphragm, a packing gland on the cover for compressing the packing and seating the diaphragm against said shoulder, a metal ring interposed between and engaging the diaphragm and the packing, and an annular flange projecting from said ring and normally spaced from the recessed end face of the flanged portion but being engageable therewith when the valve member is disengaged from its seat.

CHARLES H. COTTON.